United States Patent Office 3,431,272
Patented Mar. 4, 1969

3,431,272
DIOXA-DIAZADISPIRO[4.2.4.2]TETRADECANE
COMPOUNDS
Bernard Loev, Broomall, Pa., assignor to Smith Kline &
French Laboratories, Philadelphia, Pa., a corporation
of Pennsylvania
No Drawing. Filed Mar. 14, 1967, Ser. No. 622,914
U.S. Cl. 260—307         5 Claims
Int. Cl. C07d 85/26, 5/16, 31/40

ABSTRACT OF THE DISCLOSURE

Dioxa - diazadispiro[4.2.4.2]tetradecane compounds, prepared by reacting two moles of an α-aminoalkyl substituted methanol with one mole of 1,4-cyclohexadione, have central nervous system stimulant, anorectic, antidepressant, hypotensive and analgesic activity.

---

This invention relates to new dioxa - diazadispiro-[4.2.4.2]tetradecane compounds having pharmacodynamic activity, in particular having central nervous system stimulant, anorectic, antidepressant, hypotensive and analgesic activity.

The compounds of this invention are represented by the following formulas:

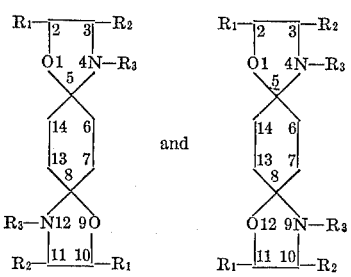

in which:

$R_1$ is phenyl, phenyl substituted by from one to two halo, hydroxy, lower alkyl or lower alkoxy substituents, trifluoromethylphenyl, cyanophenyl, methylenedioxyphenyl, pyridyl, furyl or thienyl;
$R_2$ is lower alkyl; and
$R_3$ is hydrogen or lower alkyl.

Advantageous compounds of this invention are represented by the above formulas in which $R_1$ is phenyl, halophenyl, dihalophenyl, hydroxyphenyl, dihydroxyphenyl, tolyl, xylyl, methoxyphenyl, dimethoxyphenyl and methylenedioxyphenyl, $R_2$ is methyl or ethyl and $R_3$ is hydrogen, methyl or ethyl.

Preferred compounds of this invention are represented by the above formulas in which $R_1$ is phenyl, $R_2$ is methyl and $R_3$ is hydrogen or methyl.

The compounds of this invention are prepared by the following procedure:

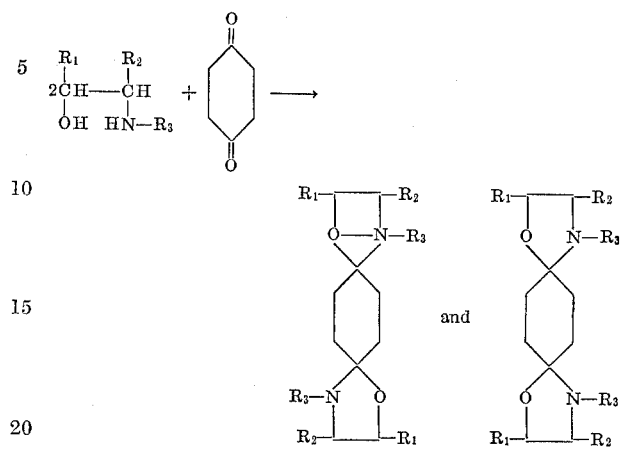

The terms $R_1$, $R_2$ and $R_3$ are as defined above.

According to the above procedure, two moles of an α-aminoalkyl substituted methanol is reacted with one mole of 1,4-cyclohexadione. The reaction is preferably carried out in an inert solvent such as a hydrocarbon, for example, benzene or toluene, at elevated temperature conveniently at reflux temperature. Advantageously, water is removed during the reaction by using an azeotroping device or a drying agent such as magnesium sulfate or molecular sieve. Optionally, an acid catalyst, such as methane sulfonic acid, toluene sulfonic acid or a strong acid ion exchange resin, may be employed, in particular when an azeotroping device is used.

The α-aminoalkyl substituted methanol starting materials are either known to the art or are prepared by the following procedure:

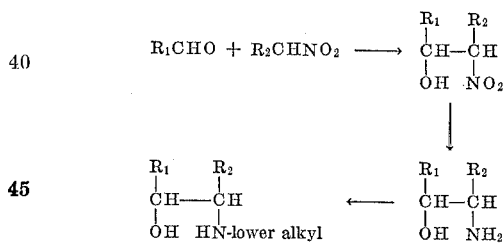

The terms $R_1$ and $R_2$ are as defined above.

According to the above procedure, a carboxaldehyde is condensed with a nitroalkane in the presence of a basic condensing agent such as a sodium methoxide in a solvent such as a methanol. Treating with acid such as dilute acetic acid gives the α-nitroalkyl substituted methanol. This nitro alcohol is reduced, for example with lithium aluminum hydride in tetrahydrofuran, to give the α-primary aminoalkyl substituted methanol starting materials. Alkylation of the primary amino compounds by, for example, reacting with a lower alkyl halide or with an acylating agent such as ethyl formate or acetyl chloride and reducing the resulting N-acylamino alcohol with a reducing agent such as lithium aluminum hydride gives the α-mono-lower alkylaminoalkyl substituted methanol starting materials.

The compounds of this invention may exist in stereo-isomeric forms, that is, as *d* and *l*-optical isomers as well as *dl*-mixtures and as cis and trans-isomers as well as cis-trans mixtures. It is intended that the general formulas presented herein include all of these stereoisomers, the separated isomers as well as mixtures thereof. The isomers are conveniently prepared from the corresponding isomers of the α-aminoalkyl substituted methanol starting materials.

The terms "lower alkyl" and "lower alkoxy" where used herein denote groups having 1–4, preferably 1–2, carbon atoms.

The compounds of this invention may be combined with pharmaceutical carriers according to accepted pharmaceutical practices and administered internally in conventional dosage forms containing an appropriate dose of the compound.

The following examples are not limiting but are illustrative of this invention.

EXAMPLE 1

To 12.1 g. of norephedrine and 4 g. of 1,4-cyclohexadione is added 130 ml. of benzene. The resulting mixture is heated at reflux while removing water. The benzene is then removed in vacuo. The residue is treated with ether, then hexane. Filtering and recrystallizing from ethyl acetate gives 3,11 - dimethyl - 2,10 - diphenyl - 1,9 - dioxa-4,12 - diazadispiro[4.2.4.2]tetradecane and 3,10-dimethyl-2,11 - diphenyl - 1,12 - dioxa - 4,9 - diazadispiro[4.2.4.2]-tetradecane.

EXAMPLE 2

Four grams of *d*-norpseudoephedrine is dissolved in dry benzene and 1.5 g. of 1,4-cyclohexanedione is added. The resulting mixture is refluxed while removing water with an azeotroping device for 21.5 hours. The mixture is concentrated in vacuo. The residue is stirred with petroleum ether and filtered. The solid material is recrystallized from isopropyl ether to give *d*-trans-3,1-dimethyl-2,10-diphenyl-1,9 - dioxa - 4,12-diazadispiro[4.2.4.2]tetradecane and *d*-trans - 3,10 - dimethyl - 2,11 - diphenyl - 1,12 - dioxa-4,9-diazadispiro[4.2.4.2]tetradecane.

EXAMPLE 3

To a mixture of 49 g. of d-pseudoephedrine, 16.8 g. of 1,4-cyclohexanedione and 200 ml. of dry benzene is added 10 drops of methanesulfonic acid and the mixture is refluxed for 16 hours while collecting water with an azeotroping device. The benzene is removed by evaporation in vacuo leaving a solid which is dissolved in boiling ethanol. The solution is treated with charcoal and filtered. The filtrate is treated with water and the solid material is filtered off and recrystallized from isopropanol to give *d*-trans - 3,4,11,12 - tetramethyl-2,10-diphenyl-1,9-dioxa-4,12-diazadispiro[4.2.4.2]tetradecane and 3,4,9,10 - tetramethyl - 2,11 - diphenyl - 1,12 - dioxa - 4,9 - diazadispiro[4.2.4.2]-tetradecane.

EXAMPLE 4

1,4-cyclohexadione (5.6 g.) is added to 19.9 g. of m-hydroxyephedrine in 150 ml. of benzene. The resulting mixture is refluxed for 16 hours while removing water. The benzene is removed in vacuo to give, as the residue, 2,10 - bis(m - hydroxyphenyl) - 3,4,11,12 - tetramethyl-1,9 - dioxa- 4,12 - diazadispiro[4.2.4.2]tetradecane and 2,11-bis(m-hydroxyphenyl)-3,4,9,10 - tetramethyl - 1,12-dioxa-4,9-diazadispiro[4.2.4.2]tetradecane.

EXAMPLE 5

By the procedure of Example 4, using, in place of m-hydroxyephedrine, the following:

o-Chloroephedrine
p-Fluoroephedrine
p-Methylephedrine
p-Butylephedrine
p-Methoxyephedrine
3,4-methylenedioxyephedrine
2,5-dimethoxyephedrine
3,4-dichloroephedrine
3,4-dimethylephedrine the following products are obtained, respectively:

2,10 - bis (o - chlorophenyl) - 3,4,11,12 - tetramethyl-1,9 - dioxa - 4,12 - diazadispiro[4.2.4.2]tetradecane and 2,11 - bis(o-chlorophenyl) - 3,4,9,10 - tetramethyl - 1,12-dioxa-4,9-diazadispiro[4.2.4.2]tetradecane, 2,10 - dis (p - fluorophenyl) - 3,4,11,12 - tetramethyl-1,9 - dioxa - 4,12 - diazadispiro[4.2.4.2]tetradecane and 2,11 - bis(p - fluorophenyl) - 3,4,9,10 - tetramethyl-1,12-dioxa-4,9-diazadispiro[4.2.4.2]tetradecane, 3,4,11,12 - tetramethyl - 2,10 - bis(p - tolyl)-1,9-dioxa-4,12 - diazadispiro[4.2.4.2]tetradecane and 3,4,9,10-tetramethyl - 2,11 - bis(p - tolyl) - 1,12 - dioxa - 4,9 - diazadispiro[4.2.4.2]tetradecane, 2,10 - bis (p - butylphenyl) - 3,4,11,12 - tetramethyl-1,9 -dioxa - 4,12 - diazadispiro[4.2.4.2]tetradecane and 2,11 - bis(p - butylphenyl) - 3,4,9,10 - tetramethyl - 1,12-dioxa-4,9-diazadispiro[4.2.4.2]tetradecane, 2,10 - bis(p - methoxyphenyl) - 3,4,11,12 - tetramethyl-1,9 - dioxa - 4,12 - diazadispiro[4.2.4.2]tetradecane and 2,11-bis(p-methoxyphenyl) - 3,4,9,10 - tetramethyl - 1,12-dioxa-4,9-diazadispiro[4.2.4.2]tetradecane, 3,4,11,12 - tetramethyl - 2,10-bis(3,4-methylenedioxyphenyl) - 1,9-dioxa-4,12-diazadispiro[4.2.4.2]tetradecane and 3,4,9,10 - tetramethyl - 2,11-bis(3,4-methylenedioxyphenyl) - 1,12 - dioxa - 4,9 - diazadispiro[4.2.4.2]tetradecane, 2,10 - bis(2,5 - dimethoxyphenyl) - 3,4,11,12-tetramethyl - 1,9 - dioxa - 4,12 - diazadispiro[4.2.4.2]tetradecane and 2,11 - bis(2,5 - dimethoxyphenyl) - 3,4,9,10-tetramethyl - 1,12 - dioxa - 4,9-diazadispiro[4.2.4.2]tetradecane, 2,10 - bis(3,4 - dichlorophenyl) - 3,4,11,12-tetramethyl-1,9 - dioxa - 4,12 - diazadispiro[4.2.4.2]tetradecane and 2,11 - bis(3,4 - dichlorophenyl) - 3,4,9,10 - tetramethyl-1,12-dioxa-4,9-diazadispiro[4.2.4.2]tetradecane, 3,4,11,12 - tetramethyl - 2,10 - bis(3,4 - xylyl) - 1,9-dioxa - 4,12 - diazadispiro[4.2.4.2]tetradecane and 3,4,9,10 - tetramethyl - 2,11 - bis(3,4 - xylyl) - 1,12-dioxa-4,9-diazadispiro[4.2.4.2]tetradecane.

EXAMPLE 6

By the procedure of Example 4, 5.6 g. of 1,4-cyclohexadione is reacted with 26.7 g. of α-(1-aminobutyl)-3,4-diethoxybenzyl alcohol to give 2,10-bis(3,4-diethoxyphenyl)-3,11 - dipropyl - 1,9-dioxa-4,12-diazadispiro[4.2.4.2] tetradecane and 2,11 - bis(3,4 - diethoxyphenyl) - 3,10-dipropyl-1,12-dioxa-4,9-diazadispiro[4.2.4.2]tetradecane.

Similarly, using α-(1 - aminoethyl) - 3,4 - dihydroxybenzyl alcohol and α-(1-aminoethyl)-2-methoxy-5-methylbenzyl alcohol in place of m-hydroxyephedrine in the procedure of Example 4 the products are, respectively:

2,10-bis(3,4-dihydroxyphenyl) - 3,11 - dimethyl - 1,9-dioxa - 4,12 - diazadispiro[4.2.4.2]tetradecane and 2,11-bis(3,4 - dihydroxyphenyl) - 3,10 - dimethyl - 1,12-dioxa-4,9-diazadispiro[4.2.4.2]tetradecane, 2,10 - bis(2 - methoxy-5-methylphenyl)-3,11-dimethyl-1,9 - dioxa - 4,12 - diazadispiro[4.2.4.2]tetradecane and 2,11 - bis - (2 - methoxy-5-methylphenyl)-3,10-dimethyl-1,12-dioxa-4,9-diazadispiro[4.2.4.2]tetradecane.

EXAMPLE 7

Heating a mixture of 15.5 g. of α-(1-methylaminoethyl)furfuryl alcohol and 5.6 g. of 1,4-cyclohexadione in benzene for 16 hours while removing water and working up as in Example 4 gives 2,10-bis(2-furyl)-3,4,11,12-tetramethyl - 1,9 - dioxa - 4,12-diazadispiro[4.2.4.2]tetradecane and 2,11 - bis(2 - furyl) - 3,4,9,10 - tetramethyl-1,12-dioxa-4,9-diazadispiro[4.2.4.2]tetradecane.

Similarly, using α-(1-aminopropyl)furfuryl alcohol in place of α-(1-methylaminoethyl)furfuryl alcohol in the above procedure the products are 3,11-diethyl-2,10-bis (2-furyl) - 1,9 - dioxa - 4,12 - diazadispiro[4.2.4.2]tetradecane and 3,10-diethyl-2,11 - bis(2 - furyl) - 1,12 - dioxa-4,9-diazadispiro[4.2.4.2]tetradecane.

By the same procedure, using α-(1-aminoethyl)-2-pyridinemethanol in place of α-(1-methylaminoethyl)furfuryl alcohol the products are 3,11-dimethyl-2,10-bis(2-pyridyl) - 1,9 - dioxa - 4,12 - diazadispiro[4.2.4.2]tetradecane and 3,10-dimethyl-2,11-bis(2-pyridyl)-1,12-dioxa-4,9-diazadispiro[4.2.4.2]tetradecane.

EXAMPLE 8

By the procedure of Example 4, using 17.9 g. of α-(1-ethylaminoethyl)benzyl alcohol and 5.6 g. of 1,4-cyclohexanedione the products are 4,12-diethyl-3,11-dimethyl-2,10 - diphenyl-1,9-dioxa-4,12-diazadispiro[4.2.4.2]tetradecane and 4,9-diethyl-3,10-dimethyl-2,11-diphenyl-1,12-dioxa-4,9-diazadispiro[4.2.4.2]tetradecane.

Similarly, using 5.6 g. of 1,4-cyclohexanedione and 20.7 g. of α-[1-(n-butyl)aminoethyl]benzyl alcohol the products are 4,12 - bis(n - butyl)-3,11-dimethyl-2,10-diphenyl-1,9 - dioxa - 4,12 - diazadispiro[4.2.4.2]tetradecane and 4,9 - bis(n - butyl) - 3,10 - dimethyl - 2,11-diphenyl-1,12-dioxa-4,9-diazadispiro[4.2.4.2]tetradecane.

EXAMPLE 9

To 17.4 g. of p-trifluoromethylbenzaldehyde and 15 g. of nitroethane in 60 ml. of ethanol at 0° C. is added a solution of 5.4 g. of sodium methoxide in 60 ml. of methanol. The resulting mixture is stirred at room temperature for six hours, then cooled and the solid material is filtered off and dissolved in water. Dilute acetic acid is added. Extracting with ether and removing the ether from the extract gives 2 - nitro - 1 - (p - trifluoromethylphenyl)propanol.

A mixture of 24.9 g. of the above prepared nitropropanol compound, 4.0 g. of lithium aluminum hydride and 350 ml. of tetrahydrofuran is stirred for two hours, then hydrolyzed by pouring into water. The mixture is made strongly alkaline with aqueous sodium hydroxide and the oil is extracted with chloroform. The extract is evaporated, in vacuo, to give α-(1-aminoethyl)-p-trifluoromethylbenzyl alcohol. A mixture of 4.3 g. of 2-amino-1-(p-trifluoromethylphenyl)propanol, 2.1 g. of methyl iodide and 100 ml. of methanol is heated at reflux for 12 hours. The resulting mixture is evaporated to dryness, in vacuo. The residue is recrystallized from isopropanol, then dissolved in warm water. The solution is made alkaline with aqueous sodium hydroxide. The oil that separates is extracted with methylene chloride and then the organic solution is concentrated to give p-trifluoromethylephedrine.

By the procedure of Example 4, using p-trifluoromethylephedrine in place of m-hydroxyephedrine the products are 3,4,11,12 - tetramethyl - 2,10 - bis(p-trifluoromethylphenyl)-1,9-dioxa-4,12 - diazadispiro[4.2.4.2]tetradecane and 3,4,9,10 - tetramethyl - 2,11 - bis(p-trifluoromethylphenyl)-1,12-dioxa-4,9-diazadispiro[4.2.4.2]tetradecane.

Similarly, using p-cyanobenzaldehyde and 2-thiophenecarboxaldehyde in place of p-trifluoromethylbenzaldehyde in the above procedures the following products are obtained, respectively:

2,10-bis(p-cyanophenyl) - 3,4,11,12 - tetramethyl - 1,9-dioxa-4,12-diazadispiro[4.2.4.2]tetradecane and 2,11-bis(p-cyanophenyl)-3,4,9,10-tetramethyl - 1,12 - dioxa-4,9-diazadispiro[4.2.4.2]tetradecane, and 3,4,11,12-tetramethyl-2,10-bis(2-thienyl) - 1,9 - dioxa-4,12-diazadispiro[4.2.4.2]tetradecane and 3,4,9,10-tetramethyl-2,11-bis(2-thienyl)-1,12-dioxa - 4,9 - diazadispiro [4.2.4.2]tetradecane.

EXAMPLE 10

By the procedure of Example 4, using α-(1-aminoethyl)-m-hydroxybenzyl alcohol and α-(1-aminoethyl)-2,5-dimethoxybenzyl alcohol the products are, respectively:

2,10-bis(m-hydroxyphenyl)-3,11-dimethyl - 1,9-dioxa-4,12 - diazadispiro[4.2.4.2]tetradecane and 2,11 - bis(m-hydroxyphenyl)-3,10-dimethyl - 1,12 - dioxa-4,9-diazadispiro[4.2.4.2]tetradecane, 2,10-bis(2,5-dimethoxyphenyl) - 3,11 - dimethyl - 1,9-dioxa-4,12-diazadispiro[4.2.4.2]tetradecane and 2,11 - bis (2,5-dimethoxyphenyl)-3,10-dimethyl - 1,12 - dioxa - 4,9-diazadispiro[4.2.4.2]tetradecane.

What is claimed is:

1. A compound selected from the group having the formulas:

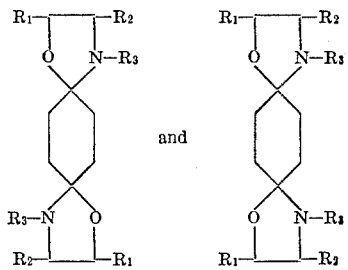

in which:

$R_1$ is phenyl, phenyl substituted by from one to two halo, hydroxy, lower alkyl or lower alkoxy substituents, trifluoromethylphenyl, cyanophenyl, methylenedioxyphenyl, pyridyl, furyl or thienyl;

$R_2$ is lower alkyl; and $R_3$ is hydrogen or lower alkyl.

2. A compound according to claim 1 in which $R_1$ is phenyl and $R_2$ and $R_3$ are methyl.

3. A compound according to claim 1 in which $R_1$ is phenyl, $R_2$ is methyl and $R_3$ is hydrogen.

4. A compound according to claim 1 in which $R_1$ is m-hydroxyphenyl, $R_2$ is methyl and $R_3$ is hydrogen.

5. A compound according to claim 1 in which $R_1$ is 2,5-dimethoxyphenyl, $R_2$ is methyl and $R_3$ is hydrogen.

References Cited

UNITED STATES PATENTS 3,264,319  8/1966  Kamal _____ 260—307

ALTON D. ROLLINS, *Primary Examiner.*

U.S. Cl. X.R.

167—55, 65; 260—296, 297, 332.3, 340.5, 347.7, 347.8, 465, 570.6, 613, 618, 622